United States Patent

O'Hara

[15] 3,637,525
[45] *Jan. 25, 1972

[54] CATALYST AND METHOD OF PREPARATION

[72] Inventor: Mark J. O'Hara, Prospect Heights, Ill.

[73] Assignee: Universal Oil Products Company, Des Plaines, Ill.

[*] Notice: The portion of the term of this patent subsequent to Apr. 21, 1987, has been disclaimed.

[22] Filed: Nov. 21, 1969

[21] Appl. No.: 878,908

[52] U.S. Cl. ................................................252/432, 208/216
[51] Int. Cl. ..........................................................B01j 11/82
[58] Field of Search ..........................252/432; 208/216, 217

[56] References Cited

UNITED STATES PATENTS 3,294,659  12/1966  O'Hara ..............................208/216 X
3,453,219  7/1969  O'Hara ..................................252/432
3,507,784  4/1970  O'Hara ...............................252/432 X Primary Examiner—Patrick P. Garvin
Attorney—James R. Hoatson, Jr. and Robert W. Welch

[57] ABSTRACT

A method of manufacturing an extruded catalyst composite of a Group VIII metal, a Group VIB metal and a refractory inorganic oxide-boron phosphate carrier material. A refractory inorganic oxide hydrogel is prepared and formed into a slurry with an aqueous solution of boric and phosphoric acids. The liquid level of the slurry is adjusted to form an extrudable mass comprising from about 15 to about 45 weight percent solids. The material is then extruded, impregnated with a metal of Group VIII and a metal of Group VIB, dried and calcined in an oxidizing atmosphere.

16 Claims, No Drawings

CATALYST AND METHOD OF PREPARATION

The present invention relates to an extruded catalyst composition characterized by its method of preparation. The catalyst is particularly adapted to the hydrorefining of petroleum crude oils, and to the hydrorefining of residual oils produced as a result of separating lighter fractions from petroleum crude oils. The residual oils are high-boiling hydrocarbonaceous oils variously referred to as asphaltum oil, liquid asphalt, black oil, petroleum tailings, residuum, residual reduced crude, bunker fuel oil, etc. Petroleum crude oils and residual oils normally contain nitrogenous and sulfurous compounds and also heptane insoluble asphaltenes which, alone or in combination, seriously impair the conversion of said oils to lower boiling more useful fractions thereof. The nitrogenous and sulfurous compounds are generally converted to ammonia and hydrogen sulfide at hydrorefining conditions and separated as gaseous products. The reduction of heptane insoluble asphaltenes to an acceptable level is somewhat more difficult. The heptane insoluble asphaltenes which occur in petroleum crude and residual oils comprise a significant fraction thereof. For example, a Wyoming sour crude having an API gravity of 23.2 at 60° F., has been shown to contain about 8.37 weight percent heptane insoluble asphaltenes. These compounds tend to deposit within a reaction zone and on the catalyst situated therein, forming a gummy hydrocarbonaceous residue which functions as a coke precursor. The deposition of this residue constitutes a significant product loss and it is economically desirable to convert such asphaltenes into useful hydrocarbon fractions.

In the hydrorefining of petroleum crude and residual oils, it is thus of considerable importance that the hydrocarbonaceous reactant stream have access not only to catalytically active sites on the outer catalyst surface but also to a maximum number of sites on the interior catalyst surface without undue retention of hydrocarbonaceous matter and ultimate degradation thereof to carbonaceous deposits. It has been determined that a high-surface area, highly porous catalyst characterized by an optimum pore volume in the macro pore range of from about 100 to about 500 Angstroms is particularly adapted to the hydrorefining of petroleum crude and residual oils as herein contemplated.

Extrusion methods afford a most economical approach to the manufacture of catalysts of the desired physical properties. By this method, an extrudable mass is pressured through orifices of predetermined size, and the extrudate is cut or broken to desired lengths. Suitable extrusion machines are simple and capable of large production capacity. Generally however, extrudates of the desired pore structure, as evidenced by low-bulk density, are characterized by low physical strength. The resulting breakage and degradation of the extrudate particles when employed in a fixed bed at hydrorefining conditions, leads to the deposition of catalyst fines in the free space of the catalyst bed creating a variation in pressure drop across the bed. The effect is a channeling of the reactant stream through the bed and, inherently, a portion of the catalyst bed being bypassed.

It is therefore an object of this invention to present an improved extruded catalyst characterized by low-bulk density and high activity with respect to the hydrorefining of petroleum crude and residual oils, and of sufficient strength to obviate any appreciable breakage and degradation at hydrorefining conditions.

In one of its broad aspects, the present invention embodies an extruded catalyst composition comprising a metal of Group VIII and a metal of Group VI composited with a refractory inorganic oxide-boron phosphate carrier material, said catalyst composition being characterized by its method of preparation which comprises preparing a hydrogel of a refractory inorganic oxide; forming a slurry of said hydrogel in an aqueous solution of boric and phosphoric acids; recovering the resulting hydrogel-boron phosphate composite and adjusting the liquid level thereof to an extrudable mass comprising from about 15 to about 45 weight percent solids, and extruding the same; drying the extrudate and impregnating the same with a metal of Group VIII and a metal of Group VI; and drying and calcining the resulting composite at a temperature of from about 700° to about 1,200° F. in an oxidizing atmosphere.

Another embodiment includes the above method of preparation further characterized in that the slurry, comprising said hydrogel slurried in said aqueous solution of boric and phosphoric acids, is treated to recover one portion thereof comprising less than about 20 weight percent solids and another portion comprising in excess of about 45 weight percent solids, a sufficient amount of the first-mentioned portion being commingled with the last-mentioned portion to form an extrudable mass comprising from about 15 to about 45 weight percent solids. The material is extruded, impregnated with a metal of Group VIII and a metal of Group VI, and dried and calcined in the aforesaid manner.

Other objects and embodiments of this invention will become apparent in the following detailed specification.

In the manufacture of the extruded catalyst composition of this invention, a refractory inorganic oxide is initially prepared as a hydrogel in combination with boron phosphate. Suitable refractory inorganic oxides include alumina, silica, zirconia, thoria, boria, and the like, or combinations thereof, particularly alumina in combination with one or more other refractory inorganic oxides. Alumina composited with silica in a weight ratio of from about 1.5:1 to about 9:1, and preferably in a weight ratio of from about 1.5:1 to about 3:1, is a particularly suitable refractory inorganic oxide. Alumina is preferably prepared composited with silica by coprecipitation or cogellation at a pH of from about 8 to about 10 or more. For example, an aqueous water glass solution may be commingled with an aqueous solution of aluminum sulfate, or other suitable aluminum salt, and the mixture admixed with an alkaline precipitating agent, suitably ammonium hydroxide, to effect cogellation of alumina and silica. The resulting hydrogel is water washed substantially free of sodium ions and, where the aluminum salt employed was a sulfate, sulfate ions. The washed hydrogel is then reslurried in an aqueous solution of boric and phosphoric acids, said acids being utilized in a mole ratio of about 1:1, and in a total amount to yield a finished carrier material comprising from about 13 to about 35 weight percent boron phosphate on a dry basis. The hydrogel-boron phosphate composite is suitably recovered as a wet filter cake and formed into extrudate particles of desired size. Binders such as starch, polyvinyl alcohol, methylcellulose, graphite, etc., may be employed if so desired, suitably in a concentration to comprise from about 1 to about 5 weight percent of the extrudable hydrogel-boron phosphate mass.

In the preparation of extrudates, the optimum amount of liquid required to form a suitable extrudable mass may vary from case to case, but for any given case is fairly critical. For example, in the present case wherein the extrudable mass comprises a refractory inorganic oxide hydrogel and boron phosphate, said extrudable mass should comprise from about 15 to about 45 weight percent solids to achieve the desired physical characteristics of the extrudate product. Further, the manner in which the solids content is adjusted will influence the pore volume and bulk density of the extrudate product as well as the activity of the final catalyst composite. Thus, where the hydrogel-boron phosphate composite has been dried to a solids content in excess of about 45 weight percent prior to extrusion thereof, a suitably extrudable mass may be prepared by the addition of water thereto. However, an extrudate product of lower bulk density and a final catalyst composite of improved activity is obtained when the hydrogel-boron phosphate composite is dried to comprise in excess of about 45 weight percent solids, and the solids content adjusted to the desired level by intimately commingling a hydrogel-boron phosphate composite therewith characterized by a solids content of less than about 20 weight percent. In this manner, the solids content is adjusted in the desired range while promoting increased pore volume and decreased bulk density of the extrudate, both being considered essential physical characteristics with respect to improved catalytic hydrorefining of petroleum crude and residual oils.

As previously mentioned, the hydrogel portion of the carrier material is preferably precipitated at a pH of from about 8 to about 10. While a higher pH may be employed, no particular improvement is derived therefrom. It is considered that the pH at which precipitation is effected is a contributing factor to the improved pore volume and bulk density of the carrier material and the final catalyst composite prepared therefrom. This is particularly evident when the hydrogel is the preferred alumina-silica cogel. The preferred pH range may be maintained in any manner which achieves the desired result. For example, in the preparation of the alumina-silica cogel, the aqueous water glass-aqueous aluminum sulfate mixture may be admixed with an excess quantity of ammonium hydroxide such that the final pH is about 8 or more. In any case, in the subsequent water-washing of the hydrogel prior to slurrying the same with the aqueous boric and phosphoric acid solutions, it is advantageous to continue said washing until the washings exhibit a substantially neutral pH. It has been observed that the boron phosphate component of the carrier material tends to complex with any residual ammonium ions in the hydrogel rather than the hydrogel itself. The intended effect of boron phosphate in the catalyst composite is thereby somewhat obviated.

While the boron phosphate component of the carrier material will function to reduce coke deposits on and in the extruded catalyst particles under hydrorefining conditions, its principle contribution is considered to be its effect on the desired pore volume and bulk density characteristics of said particles. In the preparation of the carrier material, it is believed that the boron phosphate component is best incorporated before the carrier material is extruded, and preferably before the liquid content is reduced to yield the aforesaid extrudable mass comprising from about 15 to about 45 weight percent solids. Thus, for example, the alumina-silica hydrogel is recovered as a wet filter cake, usually comprising about 20 weight percent solids, thoroughly water-washed until the water washings exhibit a substantially neutral pH, and thereafter slurried in the aqueous solution of boric and phosphoric acids, said acids being in substantially equimolar amounts and in the desired concentration.

The desired boric acid-phosphoric acid concentration is such as to insure an extruded carrier material comprising from about 13 to about 35 weight percent boron phosphate which, together with other contributing factors herein disclosed, results in an extrudate particle characterized by a bulk density of less than about 0.4 grams per cubic centimeter following the deposition of the catalytically active metal components thereon and subsequent calcination.

The catalyst composition of this invention comprises a metal of Group VIB and a metal of Group VIII composited with a carrier material. Thus, the catalyst may comprise chromium, molybdenum and/or tungsten in combination with one or more metals of Group VIII, i.e., iron, nickel, cobalt, platinum, palladium, ruthenium, rhodium, osmium and iridium. Of the Group VIB metals molybdenum is preferred. The Group VIB metal is suitably employed in an amount to comprise from about 5 to about 20 weight percent of the final catalyst composite. The Group VIII metal, which is preferably nickel, is suitably effective in amounts to comprise from about 0.1 to about 10 weight percent of the final catalyst composite. The Group VIB and the Group VIII metal component may be composited with the carrier material in any suitable manner. For example, the extrudate particles can be soaked, dipped, suspended or otherwise immersed in a common solution comprising a suitable compound of a Group VIB metal and a suitable Group VIII metal compound. Alternatively, a Group VIB metal and the Group VIII metal may be composited with the carrier material utilizing individual solutions thereof and in any convenient sequence. Suitable compounds of Group VIB metals include ammonium molybdate, ammonium paramolybdate, molybdic acid, molybdenum trioxide, ammonium chromate, ammonium peroxychromate, chromium acetate, chromous chloride, chromium nitrate, ammonium metatungstate, tungstic acid, etc. Compounds of metals of Group VIII which are suitable include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric fluoride, ferric bromide, ferric fluoride, ferric nitrate, ferric sulfate, ferric formate, ferric acetate, platinum chloride, chloroplatinic acid, chloropalladic acid, palladium chloride, etc.

The final catalyst composite, after all of the catalytic components are present therein, is usually dried for a period of from about 2 to about 8 hours or more in a steam dryer, then at from about 212° to about 260° F. in a drying oven. The dried catalyst composite is thereafter oxidized in an oxygen containing atmosphere, such as air, for a period of from about 1 to about 8 hours or more and at a temperature of from about 700° to about 1,200° F. The catalyst composite is preferably oxidized to a stable state, e.g., until the catalyst composite attains a constant weight, to realize maximum hydrorefining activity.

The hydrorefining process, utilizing the catalyst prepared in accordance with the method of the present invention, is affected by reacting the petroleum crude oil, or residual oil, and hydrogen in contact with said catalyst. The charge stock and hydrogen mixture is heated to an operating temperature within the range of from about 435° to about 930° F., and contacts the catalyst under an imposed pressure of from about 500 to about 5,000 p.s.i.g. The total reaction zone product effluent is passed into a suitable high-pressure low-temperature separator from which a gaseous phase rich in hydrogen is removed and recycled to combine with fresh hydrocarbon charge. The remaining normally liquid product effluent is then introduced into a suitable fractionator or stripping column for the purpose of removing hydrogen sulfide and light hydrocarbons including methane, ethane, and propane. Although the normally gaseous phase from the high-pressure separator may be treated for the purpose of removing the ammonia formed as a result of the destructive removal of nitrogenous compounds, a more convenient method involves the introduction of water upstream from the high-pressure separator, and removing said water and absorbed ammonia via suitable liquid level control means disposed in said pressure separator.

The following examples are presented in illustration of the present invention and are not intended as an undue limitation on the generally broad scope of the invention as set out in the appended claims.

EXAMPLE I

In the preparation of an extruded catalyst composition, 382 grams of water glass was acidified with 83 milliliters of concentrated hydrochloric acid diluted with 166 milliliters of water. The resulting hydrosol was commingled with 7.6 liters of an aqueous aluminum sulfate solution comprising 2,280 grams of aluminum sulfate. The mixture was then added to 3.7 liters of concentrated ammonium hydroxide diluted with 3.5 liters of water, the final pH being 9.2. The hydrogel product was recovered by filtration and washed substantially free of sodium, sulfate and ammonium ions. The washing procedure consisted in passing about 10 gallons of water per hour over the hydrogel for 6 hours at a temperature of 170° F. At the same time, a 20 percent aqueous ammonium nitrate solution, containing about 50 milliliters of concentrated ammonium hydroxide per liter, was passed over the hydrogel at the rate of about 150 milliliters per hour and in admixture with the water wash. The hydrogel was then subjected to a final water-washing by passing 10 gallons of water over the hydrogel for 3 hours at 170° F.

The washed hydrogel product was thereafter slurried in an aqueous solution comprising 238 grams of 85.5 percent phosphoric acid and 128 grams of boric acid at a temperature of about 160° F. The resulting composite was recovered by filtration and oven dried for about 16 hours at 250° F. to reduce the water content to about 18 weight percent (82 weight percent solids). About 395 grams of the ovendried material was mixed with 3.24 grams of soluble starch and 4.86 grams of methylcellulose, and the solids content of the mixture adjusted to about 20 weight percent by the addition of 650 milliliters of water thereto. The mixture was then extruded through one-sixteenth inch orifices and oven dried for 3 hours at 250° F.

An impregnating solution was prepared by dissolving 37 grams of molybdic acid (85 percent MoO$_3$) and 13 grams of nickel nitrate hexahydrate in about 230 milliliters of an aqueous ammoniacal solution. The impregnating solution was utilized to impregnate 122 grams of the ovendried extrudate particles, the particles being thereafter dried at a temperature of about 250° F. and oxidized in an air atmosphere for 3 hours at 1,100° F. after which time the catalyst had attained a constant weight. The extruded catalyst composition contained 2 weight percent nickel and 16 weight percent molybdenum. The extrudate particles had an average bulk density of 0.41 grams per cubic centimeter and an average crushing strength of about 5.1 pounds.

A vacuum tower bottoms characterized by an API of 8.2, 5.9 weight percent heptane-insoluble asphaltenes and 3.3 weight percent sulfur, was processed over the catalyst thus prepared at a temperature of 715°–800° F. under 3,000 p.s.i.g. hydrogen pressure and at a liquid hourly space velocity of about 1.0. Hydrogen was recycled at the rate of 15,000 cubic feet per barrel of charge stock. About 150 cc. of catalyst was disposed in intermittent fixed beds of about 10 cc. each. After 35 hours on stream, the liquid product analyzed 0.85 weight percent heptane-insoluble asphaltenes (86 percent conversion), 0.45 weight percent sulfur (86 percent conversion), and had an API of 19.1.

EXAMPLE II

A hydrogel product was prepared, water-washed and composited with boron phosphate substantially as described in example I above. However, in this case, the resulting composite was recovered by filtration on a Buchner funnel and air died to comprise about 14 weight percent solids. One portion of the filter cake was further oven dried for 16 hours at 250° F. to yield about 64 grams of said composite comprising about 18 weight percent solids. The ovendried material was thereafter intimately admixed with about 200 grams of the air-dried material and about 5 grams of soluble starch to yield an alumina-silica-boron phosphate composite comprising about 16 weight percent solids. The mixture was thereafter extruded through one-sixteenth inch orifices and oven dried at 250° F. for about 16 hours.

The dried extrudate particles were then impregnated with an impregnating solution of example I, and further dried and oxidized as therein described. The extrudate particles had an average bulk density of 0.395 grams per cubic centimeter and an average crushing strength of about 6 pounds.

The described vacuum tower bottoms charge stock was processed over the catalyst at the aforesaid conditions. After 35 hours on stream, the liquid product analyzed 0.64 weight percent heptane-insoluble asphaltenes (89 percent conversion), 0.41 weight percent sulfur (88 percent conversion), and had an API of 17.9.

I claim as my invention:

1. A method of manufacturing an extruded catalyst composition consisting essentially of from about 0.1 to about 10 weight percent Group VIII metal and from about 5 to about 20 weight percent Group VIB metal composited with a refractory inorganic oxide-boron phosphate carrier material which comprises: preparing a hydrogel of a refractory inorganic oxide; forming a slurry of said hydrogel in an aqueous solution of boric and phosphoric acids; recovering the resulting hydrogel-boron phosphate composite and adjusting the liquid level thereof to form an extrudable mass comprising from about 15 to about 45 weight percent solids, and extruding the same; impregnating the extrudate with a metal of Group VIII and a metal of Group VIB, and drying and calcining the resulting composite at a temperature of from about 700° to about 1,200° F in an oxidizing atmosphere.

2. The method of claim 1 further characterized in that said hydrogel is a composite of alumina and silica prepared by coprecipitation from a hydrosol comprising a silica sol commingled with a soluble aluminum salt.

3. The method of claim 2 further characterized in that said hydrogel comprises alumina composited with silica in a weight ratio of from about 1.5:1 to about 9:1.

4. The method of claim 2 further characterized in that said alumina and silica are coprecipitated at a pH in excess of about 8.0.

5. The method of claim 1 further characterized in that said carrier material comprises from about 13 to about 35 weight percent boron phosphate.

6. The method of claim 1 further characterized in that said calcining is effected at a temperature of from about 700° to about 1,200° F. in an oxidizing atmosphere until the composite attains a constant weight.

7. The method of claim 1 further characterized in that said Group VIII metal is nickel and comprises from about 0.1 to about 10 weight percent of the catalyst composition.

8. The method of claim 1 further characterized in that said Group VIB metal is molybdenum and comprises from about 5 to about 20 weight percent of the catalyst composition.

9. The method of claim 1 further characterized by an average bulk density of less than about 0.45 g./cc. and a crushing strength in excess of about 5 pounds.

10. A method of manufacturing an extruded catalyst composition consisting essentially of from about 0.1 to about 10 weight percent Group VIII metal and from about 5 to about 20 weight percent Group VIB metal composited with an alumina-silica-boron phosphate carrier material which comprises cogelling alumina and silica from a hydrosol comprising a silica sol commingled with a soluble aluminum salt; forming a slurry of the resulting cogel in an aqueous solution of boric and phosphoric acids; treating the slurry to recover one portion thereof comprising less than about 20 weight percent solids and another portion comprising in excess of about 45 weight percent solids; commingling sufficient of the first-mentioned portion with the last-mentioned portion to form an extrudable mass comprising from about 15 to about 45 weight percent solids, and extruding the same; drying the extrudate and impregnating the same with a metal of Group VIII and a metal of Group VIB; and drying and calcining the resulting composite at a temperature of from about 700° to about 1,200° in an oxidizing atmosphere.

11. The method of claim 10 further characterized in that said alumina and silica are coprecipitated at a pH in excess of about 8.

12. The method of claim 10 further characterized in that said carrier material comprises from about 13 to about 35 weight percent boron phosphate.

13. The method of claim 10 further characterized in that said calcining is effected at a temperature of from about 700° to about 1,200° F. in an oxidizing atmosphere until the composite attains a constant weight.

14. The method of claim 10 further characterized in that said Group VIII metal is nickel and comprises from about 0.1 to about 10 weight percent of the catalyst composition.

15. The method of claim 10 further characterized in that said Group VIB metal is molybdenum and comprises from about 5 to about 20 weight percent of the catalyst composition.

16. The method of claim 10 further characterized by an average bulk density of less than about 0.45 g./cc. and a crushing strength in excess of about 5 pounds.

* * * * *